3,218,181
CELLULOSE-POLYGLUTAMIC ACID BLEND FIBERS AND PROCESS FOR PRODUCTION
Minoru Itaya, Tokyo, Yutaka Umebayashi, Ehime-ken, Toru Okuda, Kanagawa-ken, and Yoshifumi Takeda, Tokyo, Japan, assignors to Ajinomto Co., Inc., and Fuji Spinning Co., Ltd., Tokyo, Japan, both corporations of Japan
No Drawing. Filed Mar. 19, 1963, Ser. No. 266,164
Claims priority, application Japan, Mar. 27, 1962, 37/11,254
11 Claims. (Cl. 106—163)

This invention relates to fibers of blended polymeric material, and more specifically to fibers prepared from a spinning solution containing viscose and a polypeptide, and consisting essentially of cellulose and polyamino acid.

It is known that fibers spun from blends of viscose with natural proteins, such as casein, soybean protein or zein, have high resilience and a touch closely resembling that of wool. Commercial manufacture of blended viscose-protein fibers has not been practical so far. One of the obstacles to practical use of such fibers has been the lack of uniformity of the natural protein materials available. They are also difficult to store because of their vulnerability to attack by insects, molds and bacteria.

We have found that fibers having even more desirable properties than the known viscose-protein blends can be prepared from spinning solutions containing viscose and polyglutamic acid, a material which is readily obtainable in commercial lots of reproducible properties. Polyglutamic acid, like other synthetic polyamino acids, resists the insects, molds and bacteria which attack natural proteins.

Polyglutamic acid is a more desirable constituent of a blended spinning solution than any other water soluble polyamino acid because of the low cost of optically active polyglutamic acid. The acid can be prepared by hydrolysis of its esters the repeating units of which have the formula

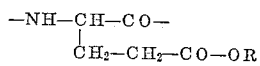

wherein OR is the radical of an alcohol. The polyglutamic acid esters are prepared in a known manner by polymerization of the gamma-esters of anhydrocarboxyglutamic acid, which in turn are the reaction products of phosgene with the gamma-esters of glutamic acid.

In the method of this invention, a viscose spinning solution may be blended with the hydrolyzation mixture obtained from the alkaline hydrolysis of the polyglutamic acid ester after suitable adjustment of the concentration of the mixture. It is not necessary to carry the hydrolysis of the ester to completion. A small amount of residual ester groups does not significantly affect the properties of the fibers ultimately obtained.

The hydrolyzation mixture can be prepared, for example, in the following manner:

Fibers of the methyl ester of polyglutamic acid are immersed in an amount of 3.5 percent aqueous sodium hydroxide solution the NaOH of which is equivalent to the ester groups in the polymer. Each volume of the mixture is combined with 1.3 volumes of methanol and the resulting reaction mixture is heated for 20 minutes to a temperature between 40° C. and 50° C. The methanol is then distilled off at low temperature and pressure, and a nearly transparent aqueous solution of sodium polyglutamate is obtained. Approximately 30 percent of the ester groups are preserved when the hydrolyzation mixture is cooled below its normal reaction temperature after 12 to 15 minutes.

It will be apparent to those skilled in the art that a solution of polyglutamic acid in its free form or in the form of its soluble salts may be prepared by other known methods. Sodium hydroxide is only one of the hydrolyzation agents which are effective in converting the ester to the free acid or its inorganic salts. The other alkali metals may be substituted for sodium and alcoholates may replace the hydroxides to produce polyglutamic acid in its free form or the form of its salts from the readily available esters. The aqueous dilute solutions of polyglutamate obtained as described above or in any other suitable manner are preferable evaporated at a temperature below 25° C. to increase the polyglutamate concentration. If methyl polyglutamate with a degree of polymerization (D.P.) of 4,000 to 5,000 is the starting material, the polyglutamic acid obtained by the aforedescribed hydrolysis still has a D.P. of 570 to 700.

The viscose solution with which the glutamic acid solution is blended is prepared by any conventional method not requiring further description and well-known in the rayon industry. The viscose solution is preferably permitted to ripen for 20 to 35 hours after the start of xanthation and is completely deaerated before the polyglutamic acid solution is admixed.

The ratio of polyglutamic acid to cellulose in the blended spinning solution should be between 1 to 100 and 50 to 100. The total concentration of polymeric material (cellulose and polyglutamic acid) is preferably about eight percent.

When the total concentration of alkali in the spinning solution is about 6 percent, the blended spinning solution has the same spinning properties as a conventional viscose spinning solution and may thus be spun on conventional equipment for the production of viscose rayon observing the precautions and following the procedures of normal viscose spinning. Prolonged storage of the blended spinning solution should be avoided to prevent degradation of the dissolved polyglutamic acid.

The synthetic fibers obtained from the blended solution have a crimped appearance. Their Young modlulus is high and their modulus of compressional resilience is particularly good. The fibers have a touch much closer to wool than to normal viscose fibers.

The results obtained can be varied by modifying processing conditions in a known manner. The degree of polymerization of the polyglutamic acid in the spinning solution should be kept above 600 if the wool-like touch is to be obtained. With polyglutamic acid having a D.P. below 400, a significant resemblance to wool cannot be produced. The proportion of polyglutamic acid and cellulose in the fibers also affects their properties. For highest resilience and a touch which most closely resembles that of wool, there should be at least 25 parts of polyglutamic acid to each 100 parts of cellulose. Variations in spinning conditions have the effects on fiber properties which may be expected from the practice of rayon spinning.

The following examples are further illustrative of this invention but it will be understood that the invention is not limited to the examples.

*Example 1*

An aqueous solution of sodium polyglutamate having an average molecular weight of 77,000 was deaerated and mixed with a conventional viscose solution which had been completely deaerated and which had ripened 25 hours after the start of xanthation.

The blended spinning solution had the following properties:

Cellulose ------------------------- 7.3%.
Sodium polyglutamate ------------- 0.7%.
Total alkali (as NaOH) ------------ 6.2%.
Degree of ripening (ammonium
  chloride value) ----------------- 11.0.
Viscosity (falling ball method) -- 36.4 seconds.
Ripening time (after addition
  of $CS_2$) ---------------------- 25 hours 30 minutes.

The blended solution was extruded from a spinneret by the conventional procedure of spinning crimped viscose staple fibers using the following coagulating baths and process conditions:

First coagulating bath:
  Sulfuric acid -------------------- g./l__ 106
  Sodium sulfate ------------------- g./l__ 365
  Zinc sulfate --------------------- g./l__ 15
  Temperature --------------------- ° C__ 45
Second and third coagulating baths:
  Temperature --------------------- ° C__ 85
  Spinning speed ------------------ m./min__ 60
  Stretch, total ------------------ times__ 1.65
  First bath ---------------------- do__ 1.40
  Second bath --------------------- do__ 1.16
  Third bath ---------------------- do__ 1.02

The fibers produced had a wool-like touch. Their characteristic properties and those of fibers produced as comparison samples from viscose alone under otherwise identical conditions are listed in the table which follows the examples and will be discussed hereinafter.

Example 2

A spinning solution was prepared from a deaerated aqueous solution of sodium polyglutamate having an average molecular weight of 72,000 and a viscose solution in the manner described in Example 1 to produce a cellulose concentration of 6.7% and a sodium polyglutamate concentration of 1.3% in the spinning solution. The properties of the fibers prepared are listed in the table.

Example 3

Fibers were prepared from a spinning solution containing 6.1% cellulose and 1.9% sodium polyglutamate. The sodium polyglutamate had an average molecular weight of 92,000. The fibers had a touch closely resembling that of wool. Their other characteristic properties are found in the table.

Example 4

A solution of potassium polyglutamate having an average molecular weight of 74,000 was combined with a viscose solution in the manner described in Example 1 to prepare a spinning solution containing 6.7% cellulose and 1.3% potassium polyglutamate. In all other respects the spinning solution was substantially identical with that described in Example 1, and was spun into fibers in the manner of that example. The properties of the wool-like fibers produced are shown in the table.

Example 5

An aqueous solution of ammonium polyglutamate having an average molecular weight of 63,000 was mixed with a viscose solution as described in Example 1 to form a spinning solution containing 6.7% cellulose and 1.3% ammonium polyglutamate. The solution was not significantly different from that of Example 1 in all other respects, and it was spun into fibers in an analogous manner. The fibers produced had a touch similar to that of wool fibers. Their other properties are listed in the table.

TABLE.—FIBER PROPERTIES

| Origin of Fibers | Denier | Dry-Tenacity, g./denier | Dry El'n., percent | Young's Modulus Dry, g./den. | Compress. Resilience Mod., percent | Polygl. Acid, percent |
|---|---|---|---|---|---|---|
| Example 1 | 2.76 | 2.86 | 21.2 | 48.0 | | 8.6 |
| Example 2 | 5.12 | 2.02 | 22.5 | 43.5 | 40.8 | 13.8 |
| Example 3 | 5.13 | 2.07 | 20.2 | 53.4 | 43.2 | 20.2 |
| Example 4 | 4.96 | 2.00 | 21.9 | 46.2 | 36.5 | 12.5 |
| Example 5 | 6.6 | 2.01 | 19.4 | 35.7 | 37.6 | 13.3 |
| Common staple fiber | 5.16 | 2.26 | 20.2 | 32.6 | 30.3 | 0 |
| Dull staple fiber | 5.20 | 2.63 | 21.3 | 31.4 | 32.1 | 0 |

As is evident from the table, compressional resilience and Young's modulus increase for comparable denier count with the content of polyglutamic acid in the fibers. Highest values are reached at 20.2 percent polyglutamic acid (balance essentially cellulose), and are very much higher than those of an otherwise comparable viscose rayon material. The cation associated with the polyglutamic acid during the performance of the method of the invention is without significant influence on the results achieved.

While the invention has been described with reference to specific embodiments thereof, it is to be understood that it is not limited thereto, but is to be construed broadly and restricted solely by the scope of the appended claims.

What is claimed is:

1. A method of preparing blended synthetic fibers which comprises admixing a partially hyrdolyzed solution of polyglutamic acid to an alkaline viscose solution, and spinning the resulting mixed solution.

2. A method as set forth in claim 1, wherein said viscose solution is ripened and deaerated prior to said admixing.

3. A method as set forth in claim 1, wherein said polyglutamic acid is contained in said partially hydrolyzed solution thereof in the form of its salt with a member of the group consisting of alkali metals and ammonium.

4. A method as set forth in claim 1, wherein the ratio of polyglutamic acid to cellulose in said resulting mixed solution is between 1 to 100 and 50 to 100.

5. A method as set forth in claim 4, wherein said ratio is not substantially smaller than 25 to 100.

6. A fiber consisting essentially of a homogeneous blend of polyglutamic acid and cellulose.

7. A fiber as set forth in claim 6, wherein the ratio of said polyglutamic acid to said cellulose is between 1 to 100 and 50 to 100.

8. A fiber as set forth in claim 7, wherein said ratio is not substantially smaller than 25 to 100.

9. A method of preparing blended synthetic fibers which comprises:
   (a) partially hydrolyzing an ester of polyglutamic acid in an alkaline aqueous medium until an aqueous alkaline solution of polyglutamic acid is produced;
   (b) admixing said solution to an alkaline viscose solution; and
   (c) spinning the resulting mixture.

10. A method as set forth in claim 9, wherein the degree of polymerization of said ester and of said polyglutamic acid is higher than 400.

11. A method as set forth in claim 9, wherein the alkalinity of said mixture corresponds approximately to a total sodium hydroxide content of 6 percent.

References Cited by the Examiner

UNITED STATES PATENTS

| | | | |
|---|---|---|---|
| 2,291,701 | 8/1942 | Dreyfus | 18—54 |
| 2,338,920 | 1/1944 | Ferretti | 18—54 |
| 2,339,408 | 1/1944 | Jacokes et al. | 18—54 |
| 2,904,538 | 9/1959 | Gaertner et al. | 260—112 |
| 3,089,749 | 5/1963 | Ballard | 264—210 |

OTHER REFERENCES

Ser. No. 257,029, De Kadt (A.P.C.), published April 1943.

Bamford et al., Synthetic Polypeptides, published 1956 by Academic Press, Inc., N.Y.; pp. 319, and 332 are relied upon.

International Encyclopedia of Chemical Science, Van Nostrand Co. Inc., N.Y., 1964, pp. 951, 952.

ALEXANDER H. BRODMERKEL, *Primary Examiner.*

MORRIS LIEBMAN, *Examiner.*